April 1, 1969  H. GAWLICK  3,435,765
CARTRIDGE
Filed May 1, 1967
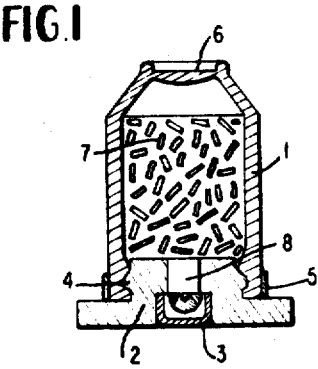
FIG.1
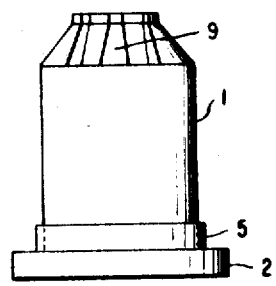
FIG.2
FIG.3A
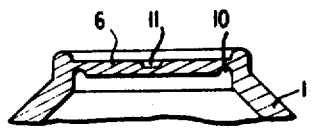
FIG.3B
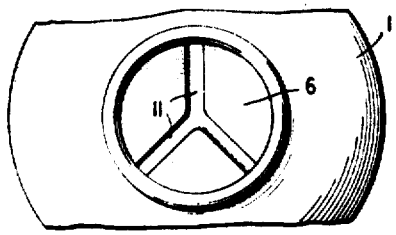
FIG.4
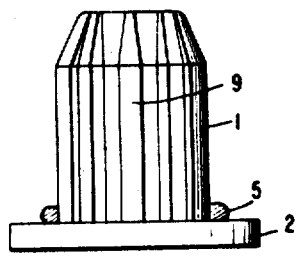
FIG.5
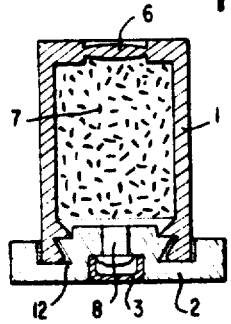
FIG.6
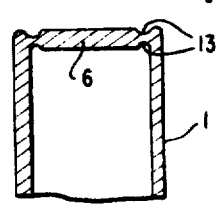
INVENTORS
HEINZ GAWLICK
HANS UMBACH
BY
ATTORNEYS

United States Patent Office 3,435,765
Patented Apr. 1, 1969

3,435,765
CARTRIDGE
Heinz Gawlick, Furth, and Hans Umbach, Stadeln, Germany, assignors to Dynamit Nobel Aktiengesellschaft, Troisdorf, Germany
Filed May 1, 1967, Ser. No. 635,210
Int. Cl. F42b 9/06, 5/14
U.S. Cl. 102—39                                      12 Claims

ABSTRACT OF THE DISCLOSURE

The present disclosure relates to a propellant cartridge for commercial devices driven by powder charge, for example, rivet guns, or cattle stunning devices, that have a propellant charge in a cartridge case having a shank portion of a synthetic polymer closed at one end by a bottom piece containing a primer and closed at its opposite forward end by a synthetic polymer disc homogeneously integral with the shank portion, that is, the shank portion and forward closure disc are constructed in one piece of a synthetic polymer. Suitable bursting grooves are provided to separate the closure disc from the case shank upon ignition of the propellant charge and subdivide the disc into a plurality of separate pieces. Also, the case shank may be provided with a plurality of longitudinally extending bursting grooves for tearing the case shank into a plurality of strips that may extend the entire length of the case shank.

Background

Known commercial devices driven by powder charge, for example, rivet guns, cattle stunning devices and the like, employ propellant cartridges with rim firing or central firing. These propellant cartridges may include a cartridge case made of metal and/or a synthetic polymer, for example, a synthetic thermoplastic material, which is closed off at the front end by folding the wall of the case or by flanging this wall into or over a cover plate of cardboard or plastic. In order to positively prevent the escape of the propellant powder from the cartridge case, there must be a very tight sealing of the front end of the case in both of the above-mentioned constructions; consequently, particular care must be exercised when manufacturing the closure to ensure sealing and prevent undesirable and dangerous disturbances of the propellant charge, which require considerable additional expenditure. Furthermore, there is the danger that during folding or flanging of the closure, the high pressures required may tear off portions of the case wall to disturb and adversely effect the function of the device.

It is an object of the present invention to overcome the above-disadvantages and provide a simple, reliable and economical closure for a propellant cartridge case.

Summary of the invention

According to the present disclosure, such a propellant cartridge is provided with a propellant powder charge accommodated in a generally tubular cartridge shank of a thermoplastic synthetic material having a bottom piece with a suitable primer closing the rear end of the shank and a disc closing the front end of the shank to seal in the powder charge, wherein the case shank and disc are formed of one homogeneously integral piece. Further advantages are achieved by providing a weakened reduced thickness breaking zone between the case shank and the closure disc so that the disc will readily separate during ignition of the powder charge; even when this cartridge is handled in an amateur and rough manner, the closure disc cannot accidentally fall out of the shank so that there will be no leakage of the powder charge. After ignition, the propellant powder gases attain a predetermined pressure to rupture the breaking zone and separate the disc from the shank before an undesirable detachment of portions of the shank wall takes place. This breaking zone may be constructed as an annular groove at the transition between the shank and closure disc or it can be produced by constructing the closure disc with a central thick portion gradually reducing in thickness outwardly to the point of transition between the shank and closure disc. By suitably dimensioning the breaking zone thickness, it is possible to synchronize the moment of separation of the case shank and closure disc with a pre-set, desired gas pressure.

An additional feature of the present invention having additional advantages relates to a construction of the case shank wherein its forward portion reduces in diameter by means of a conical portion or a right angle bend or the like constriction so that the transition between the shank and closure disc has a considerably smaller internal diameter than the internal diameter of the rearward portion of the shank, preferably within the range of ⅓ to ⅔ of the internal diameter of the shank rearward portion. With this construction, the discharge opening that is available to the ignited powder gases after the closure disc has separated from the shank is likewise correspondingly smaller than the internal diameter of the rearward portion of the shank and therefore an improved combustion of the propellant powder charge is achieved. Again, a suitable dimensioning of the thickness ratios within the region of the predetermined breaking zone can correlate the instant of separation between the case shank and closure disc to a predetermined, desired gas pressure.

A further improvement of the above structure provides for a subdivision of the closure disc into a plurality of separate pieces by means of a plurality of bursting grooves subdividing the closure disc. According to this structure, the closure disc has a plurality of bursting grooves subdividing it either on the outside and/or the inside to insure the desired fracture of the closure disc; here again, the relative thicknesses of the bursting grooves for the closure discs may be chosen so that the instant of bursting is correlated to a predetermined fixed desired initial gas pressure. Further objects, features and advantages of the present invention will become more apparent from the following detailed description of the drawings.

Brief description of the drawings

FIGURE 1 shows an axial section through a propellant cartridge having a conically tapered front end of the case shaft and employing the features of the present invention;

FIGURE 2 is a side elevation view of the propellant cartridge according to FIGURE 1 and showing external ribs on the front end of the case shank;

FIGURES 3a and 3b show a partial cross-sectional view and a top partial plan view of a modified form of the FIGURE 1 embodiment;

FIGURE 4 shows a side elevation view of a modified form of the propellant cartridge according to any of the above figures wherein the external ribs extend the entire length of the case shank;

FIGURE 5 is an axial cross-sectional view of a further embodiment of FIGURE 1; and FIGURE 6 is a partial cross-sectional view of another embodiment of FIGURE 1.

Detailed description of the drawings

In FIGURE 1, the case shank 1 is constructed of a synthetic polymer, for example, a thermoplastic synthetic material. The case shank 1 is generally tubular and closed at its rearward end by a bottom piece 2 having a primer 3 therein and constructed of a similar synthetic thermoplastic material or metal. The bottom piece 2 is securely attached to the rear end of the case shank 1 by means of the interlocking annular groove and annular rib generally indicated at 4; this connection may be reinforced by means of the annular metallic ring 5, if desired, for specific advantages, but may be omitted in the broader aspects of the invention. The case shank includes a rearward relatively large internal diameter portion, an intermediate conical portion and a forward relatively small internal diameter portion. The forward relatively small internal diameter portion of the case shank is closed by means of a closure disc 6 that is provided as one homogeneously integral piece with the case shank and of necessity constructed of the same synthetic polymer. As shown in FIGURE 1, the closure disc has a thickness that diminishes from its central portion outwardly to the transition from the relatively thin edge of the closure disc to the relatively thick portion of the case shank 1 so that a predetermined braking zone is created at this transition for separating the closure disc 6 and expelling it by the propellant gases developed upon firing of the propellant powder charge 7 suitably ignited by the primer through the ignition channel 8.

According to FIGURE 2, the conically tapered intermediate portion of the case shank 1 may be provided on its outside with a plurality of generally longitudinally extending bursting grooves for tearing the case shank into a plurality of strips during firing to improve the mechanical or manual ejection of the case from the cartridge chamber after firing, particularly in automatic weapons. These bursting grooves 9 have a thickness that is substantially smaller than the remaining portions of the case shank 1 and are not shown in FIGURE 1 only because the FIGURE 1 cross-section is taken through the thick webbed portions between the bursting grooves 9.

FIGURE 3 shows a cartridge case that is identical to the cartridge case of FIGURES 1 and 2 except for the illustrated portions that are provided with corresponding numerals for corresponding parts. In FIGURE 3, the closure disc is constructed with a constant thickness and has a breaking zone formed by an annular weakening groove 10 along the circumference of the closure disc 6 in the area of transition from the closure disc 6 to the case shank 1. Moreover, the closure disc 6 is provided with a plurality of bursting grooves having a substantially less thickness than the remaining portions of the closure disc to subdivide it by fracture into a plurality of separate small pieces when the propellant powder charge is ignited so that closure disc 6 will be expelled in a plurality of pieces rather than in a single piece that would be the case in regard to FIGURE 1. Furthermore, it is contemplated that the closure disc 6 of FIGURE 1 may be provided with a plurality of bursting grooves identical to the bursting grooves 11 of FIGURE 3 or conversely, the structure of FIGURE 3 may be provided with a plurality of bursting grooves on its conical shank portion identical to the bursting grooves 9 shown in FIGURE 2.

In order to improve the automatic or manual ejection of the empty case from a cartridge chamber of the firing device, the bursting grooves 9 of FIGURE 2 may extend longitudinally for the entire length of the case shank as shown in FIGURE 4. Furthermore, the metallic annular ring 5, partially in cross-section, may be of a shape different from that shown in FIGURE 1, for example as shown in FIGURE 4. The specific features of FIGURE 4 may be combined with the features shown in FIGURES 1-3; that is, the case shank 1 for the devices of FIGURES 1-3 may be provided with a plurality of bursting grooves 9 extending over their entire longitudinal length.

In the cartridge illustrated in FIGURE 5, the case shank 1 is of a uniform diameter throughout its cylindrical length and has a radially extending annular intermediate portion joined at its foremost end with the closure disc 6 which is constructed in one piece with the case shank 1. The transition between the closure disc 6 and the case shank 1 forms a breaking zone due to its relatively small thickness as compared to the thicker walls of the adjacent parts, that is, the main portion of the closure disc 6 and the case shank 1. The closure disc 6 has a substantially smaller diameter than the cylindrical rearward portion of the case shank 1 so that the discharge opening formed after the separation of the closure disc 6 will produce a restricted exit for the propellant gases similar to the restricted exit that will be obtained with the embodiments of FIGURES 1-4; that is, the cross-section of this discharge opening will be substantially smaller than the internal cross-section of the case shank 1. Furthermore, the closure disc 6 in FIGURE 5 may be provided with a plurality of bursting grooves identical to those illustrated with respect to FIGURE 3 and the case shank 1 may have its radially extending portion provided with a plurality of bursting grooves 9 similar to those shown in FIGURE 2 with respect to the conical portion or the case shank 1 may be provided with a plurality of bursting grooves extending over its entire length similar to those shown at 9 in FIGURE 4. In addition, FIGURE 5 illustrates a connection between the case shank 1 and the bottom piece 2 that may be employed with any of the cartridge cases shown in FIGURES 1-4 or FIGURE 6; this construction employs an axially opening groove in the bottom piece 2 that widens rearwardly and a similarly shaped rib portion on the terminal end of the case shank 1 and an overlapping abutment portion immediately forward of the bottom piece 2, so that no reinforcing ring will be needed.

In FIGURE 6, the closure disc 6 may be formed with a diameter substantially corresponding to the internal diameter of the case shank 1, even though this will not be as desirable as the restricted opening produced by the cases of FIGURES 1-5 in many respects. Internal and external annular weakening grooves 13 form a predetermined breaking zone to assure the satisfactory separation of the closure 6 during ignition at the transition from the closure disc 6 to the case shank 1. Although advantages are obtained with opposite weakening grooves 13, a single groove may be employed. Furthermore, the lens shaped cross-section of the closure disc 6 in FIGURE 1 may be incorporated with the closure disc 6 in FIGURE 6. Likewise, the case shank 1 in the embodiment of FIGURE 6 may be provided with a plurality of bursting grooves over its forward area only or over its entire area as shown respectively at 9 in FIGURES 2 and 4. Moreover, the closure disc 6 of FIGURE 6 may be provided with a plurality of bursting grooves subdividing it substantially identical to the bursting grooves 11 shown in FIGURE 3.

The above embodiments, modifications, and specific details that have been described with respect to the drawing are for illustrative purposes in regard to the broader aspects of the invention and show details of the more specific aspects of the invention; further modifications, variations and embodiments are contemplated within the spirit and scope of the following claims.

We claim:
1. A propellant cartridge having a front end and a rear end for commercial devices driven by a powder charge, for example, rivet guns, cattle stunning devices, or the like, comprising: a generally tubular cartridge case having a shank portion of a synthetic polymer; a propellant powder charge in said cartridge case; a bottom piece having a primer and being mounted in the rear end of said shank portion; disc shaped means covering said propellant powder charge at the front end of said shank portion and being of a synthetic polymer homogeneously integral in one piece with said shank portion; said shank portion and said disc shaped means being joined by a portion having a thickness substantially less than the remainder of said shank portion and the re- mainder of said disc shaped means to constitute separation means forming a predetermined substantially annular breaking zone to rupture and separate said disc shaped means completely from said shank portion upon ignition of said propellant powder charge.

2. The propellant cartridge according to claim 1, said shank portion having a rearward portion of relatively large internal diameter, an intermediate portion and a forward portion having an internal diameter substantially smaller than said rearward portion; said separation means being annular, connected to said forward portion and having a diameter substantially within the range of ⅓ to ⅔ the internal diameter of said shank rearward portion.

3. The propellant cartridge according to claim 2, wherein said disc shaped means includes a plurality of bursting grooves having a substantially less thickness than the remainder of said disc shaped means subdividing it to constitute fracture means for dividing said disc shaped means into a plurality of separate small pieces when said propellant powder change is ignited.

4. The propellant cartirdge according to claim 3, wherein said shank portion includes a plurality of shank bursting grooves of less diameter than the remainder of said shank portion generally longitudinally extending rearwardly from its forward edge to constitute tearing means for longitudinally tearing said shank portion into a plurality of individual strips upon ignition of said propellant powder charge.

5. The propellant cartridge according to claim 4, wherein said shank bursting grooves extend substantially the entire longitudinal length of said shank portion.

6. The propellant cartridge according to claim 1, wherein said disc shaped means includes a plurality of bursting grooves having a substantially less thickness than the remainder of said disc shaped means subdividing it to constitute fracture means for dividing said disc shaped means into a plurality of separate small pieces when said propellant powder charge is ignited.

7. The propellant cartridge according to claim 1, wherein said shank portion includes a plurality of shank bursting grooves of less diameter than the remainder of said shank portion generally longitudinally extending rearwardly from its forward edge to constitute tearing means for longitudinally tearing said shank portion into a plurality of individual strips upon ignition of said propellant powder charge.

8. The propellant cartridge according to claim 7, said shank portion having a rearward portion of relatively large internal diameter, an intermediate portion and a forward portion having an internal diameter substantially smaller than said rearward portion; said separation means being annular, connected to said forward portion and having a diameter substantially within the range of ⅓ to ⅔ the internal diameter of said shank rearward portion.

9. The propellant cartridge according to claim 7, wherein said disc shaped means includes a plurality of bursting grooves having a substantially less thickness than the remainder of said disc shaped means subdividing it to constitute fracture means for dividing said disc shaped means into a plurality of separate small pieces when said propellant powder charge is ignited.

10. The propellant cartridge according to claim 7, wherein said shank bursting grooves extend substantially the entire longitudinal length of said shank portion.

11. A propellant cartridge having a front end and a rear end for commercial devices driven by a powder charge, for example, rivet guns, cattle stunning devices, or the like, comprising: a generally tubular cartridge case having a shank portion of a synthetic polymer; a propellant powder charge in said cartridge case; a bottom piece having a primer and being mounted in the rear end of said shank portion; disc shaped means covering said propellant powder charge at the front end of said shank portion and being of a synthetic polymer homogeneously integral in one piece with said shank portion; said shank portion including a plurality of shank bursting grooves of less diameter than the remainder of said shank portion generally longitudinally extending rearwardly from its forward edge to constitute tearing means for longitudinally tearing said shank portion into a plurality of individual strips upon ignition of said propellant powder charge.

12. The propellant cartridge according to claim 11, wherein said shank bursting grooves extend substantially the entire longitudinal length of said shank portion.

References Cited

UNITED STATES PATENTS

| 3,144,827 | 8/1964 | Boutwell | 102—39 |
| 3,283,718 | 11/1966 | Stadler et al. | 102—39 |
| 3,352,239 | 11/1967 | Schinnerer et al. | 102—43 |

FOREIGN PATENTS 1,094,753  12/1954  France.

ROBERT F. STAHL, *Primary Examiner.*

U.S. Cl. X.R.

102—43